United States Patent [19]

Kruszona

[11] 4,169,305

[45] Oct. 2, 1979

[54] ROLLER FOR INSERTING FILLER MATERIAL IN CREVICES

[75] Inventor: Edward G. Kruszona, Schenectady, N.Y.

[73] Assignee: General Electric Company, Waterford, N.Y.

[21] Appl. No.: 797,972

[22] Filed: May 18, 1977

[51] Int. Cl.[2] .............................................. B23P 19/02

[52] U.S. Cl. ...................................................... 29/235

[58] Field of Search .................... 425/458, 87; 29/235, 29/278, 450; 81/9.1 R, 8.1 R; 404/87, 74; 140/109

[56] References Cited

U.S. PATENT DOCUMENTS

| | | | |
|---|---|---|---|
| 1,916,887 | 7/1933 | McClain | 404/87 |
| 2,761,199 | 9/1956 | Allen | 29/235 |
| 3,439,406 | 4/1969 | Wallen | 29/235 |
| 3,532,032 | 10/1970 | Weber | 404/87 |
| 3,541,660 | 11/1970 | Soto | 29/235 |

FOREIGN PATENT DOCUMENTS

| | | | |
|---|---|---|---|
| 1087338 | 8/1960 | Fed. Rep. of Germany | 404/87 |
| 559086 | 10/1973 | Switzerland | 81/9.1 R |

*Primary Examiner*—James L. Jones, Jr.
*Attorney, Agent, or Firm*—John L. Young; E. Philip Koltos; Philip L. Schlamp

[57] ABSTRACT

There is provided a roller for inserting filler material to the proper depth in crevices comprising a circular structure having a central circular section of at least 1/16" of an inch thick but less than ¼ of an inch thick, a first and second truncated right angle cone sections of a smaller diameter than said central circular section and appended on each side of said central circular section at its base line to which is attached a third or fourth circular section of uniform thickness appended to the truncated side of said conical section. The circular structure is supported on a shaft which shaft is supported by two-support members which are connected to a base plate which may be attached to a handle. This construction allows the worker to grasp the handle and utilizing said circular structure which is free to rotate on said shaft such that the leading edge of said central circular section can be utilized to force filler material to the proper depth in a crevice.

10 Claims, 7 Drawing Figures

ROLLER FOR INSERTING FILLER MATERIAL IN CREVICES

BACKGROUND OF THE INVENTION

There is provided by the present invention a roller for inserting filler material in crevices, and more particularly there is provided by the present invention a roller for inserting material in crevices between concrete blocks or panels over which there can be applied a room temperature vulcanizable silicone rubber composition to seal the crevice.

It is noted that high-rise buildings are usually constructed of concrete blocks or prefabricated sections or panels which are brought together to prescribed proximity to allow for expansion, contraction and room for an expansion joint. It is also noted in the fabrication of buildings from cinder blocks, concrete blocks or bricks, that in the fabrication of walls that there may be formed crevices between adjacent walls. In the case of concrete blocks or panels, such crevices in the fabrication of walls is more apparent. The concrete blocks or Panels are fabricated next to each other with a slot between the blocks for an expansion joint. Normally, there arises a crevice distance between the concrete blocks of anywhere from a ¼" to 1½" or more in width. Accordingly, it is necessary then to seal such concrete blocks to each other to prevent the passage of the elements as well as heat energy through the crevices between such concrete blocks and to allow for expansion and contraction. Accordingly, such sealing operation is carried out by inserting a filler material initially into the crevice between the concrete block and applying over the filler material a sealant which cures in place to form a seal. The reason the filler material is needed to be inserted into the crevices in that if no filler material is utilized the entire thickness of the concrete blocks would have to be filled with sealant resulting in unnecessarily excessive, costly use of sealant, the operation being very expensive. Accordingly, in the sealing of such concrete blocks it is highly desirable to insert a filler material such as polyethylene rod or polyvinyl chloride rod or rod tubing of another material in the crevice so that it will serve as a backup there and keep the sealant that is applied thereover in the proper position to seal the concrete blocks to each other. It should be noted that any type of filler material may be utilized to be inserted to the crevice. There can be utilized cotton tubing, dacron tubing or nylon tubing. Most preferably both for the purpose of its function as filler material and also in terms of cost there is preferred polyethylene tubing and polyvinylchloride tubing. Preferably, such tubing has a slightly larger diameter than the crevice so it can be forced into the crevice and stay in place so as to support the sealant that is applied thereover to seal the crevice. Accordingly, it is desirable to have a roller apparatus or article which can insert the filler material in the crevice with ease and economy, so that it will take as little time as possible to position the filler material in the crevice. Further it has been found that in the application of silicone sealants that it is highly desirable for crevice openings varying from ¼" to ¾" that the depth of silicone sealant be approximately ½ the size of the width of the crevice in which the silicone sealant is applied. For crevice openings of more than ¾", it is recommended and it has been found that the proper depth of silicone sealant that is to be applied in the crevice, be a constant ⅜" in depth or thickness since that depth or thickness of the sealant in its cure state will have the best strength in such sealing of crevices. Accordingly, for crevices of a width of anywhere from ¼" to ¾" in width and from ¾" to 1½" in width it is preferred to have the filler material inserted in the crevice such that the crevice depth on top of that filler material is ½ the size of the width for crevice openings up to ¾" and that the crevice depth on top of the filler material be a maximum of ⅜" for crevice openings having a width from ¾" to 1½". If the filler material is so placed in the crevice and then the silicone sealant is applied and cured in position to seal the concrete blocks there is obtained a seal of maximum strength in adhering the concrete blocks to each other.

Accordingly, previously when the construction worker who inserted such filler material and sealant was utilized to seal crevices it was necessary for him to carry out the foregoing measurements in the placement of the filler material. In such cases the measurement of the filler material depth in the crevice by the construction worker was carried out in a haphazard fashion since it necessitated a constant measurement of the depth of the crevice to which the filler material was inserted by the construction worker and also resulted in the unnecessary expenditure of time in the sealing of such crevice. Accordingly, it was highly desirable to have an apparatus which would speedily and easily force the filler material into the crevice between concrete blocks at the proper depth for the application of room temperature vulcanizable silicone rubber sealant to seal the crevice between the concrete blocks. It should be noted that while most of the above discussion has been concerned with the sealing of crevices in concrete blocks, such a roller apparatus could also be utilized to insert a backer rod between cinder block walls, brick walls, and all types of masonry walls in which there was present a sizable crevice between masonry walls and other types of walls. It should also be noted that while in the above discussion the application as a sealant of a room temperature vulcanizable silicone rubber compositions was discussed a roller apparatus could also be utilized with modifications for sealing with other types of sealants other than silicone sealants such as polysulfide sealants.

Accordingly, it is one object of the present invention to provide for inserting a filler to the proper depth in crevices for the application of a sealant thereover.

It is an additional object of the present invention to provide for a roller article for inserting filler material in a crevice to the proper depth with ease and facility.

It is yet an additional object of the present invention to provide an economical and inexpensive roller article for inserting filler material commonly known as backer rod to the proper depth in concrete crevices over which there can be applied a silicone sealant to seal the crevice.

Yet an additional object of the present invention is to provide for a roller article for inserting filler material to the proper depth in crevices, the roller article being simple and inexpensive to construct and which can be utilized for the use of silicone sealant in sealing crevices in concrete blocks.

These and other objects of the present invention are accomplished by means of the disclosure set forth herein below.

SUMMARY OF THE INVENTION

In accordance with the above objects there is provided by the present invention a roller article for inserting filler material to the proper depth in crevices comprising (1) a circular structure having a central circular section being at least 1/16" thick but less than ¼" thick, a first and second truncated right angle cone sections of a smaller diameter than the central section and appended on each side of said circular section with the base line of said truncated cone sections being adjacent to the central section, and a third and fourth circular section of uniform thickness appended to the truncated part of said cone sections and having a diameter which is as large as the diameter of said cones at their truncated side and having a thickness of at least 1/16" wherein the said center lines and axis of the central section, the truncated cone sections and said third and fourth circular section coincide and wherein the circular section is symmetrical on either side of the center lines passing through said central circular section; (2) a shaft passing through an opening in said circular structure so as to support said circular structure and allowing it to rotate and the axis of said shaft being coincident with the axis of said circular structure; (3) two support members supporting said shaft on both sides of such circular structure and allowing such circular structure to rotate about said shaft and (4) a base plate connected to said support members such that said circular structure is free to rotate on said shaft is supported by said support members and said base plate. It can be appreciated that normally the circular structure is formed from as an integral piece from a plastic and further the circular structure along with said shaft can be formed as an integral part from a plastic material, such as a polycarbonate plastic or it can be formed from a metal. Preferably in the use of silicone sealants and for the positioning the silicone sealants on filler material in concrete crevices the central circular section in the circular structure is of a uniform thickness of 3/16" with the leading edge of the base line of said truncated cone sections varying from ⅛" to 2/8" from the outer diameter of the central circular section. Most preferably, this leading edge of the base of said truncated cone sections is located ⅛" from the outer diameter of said central circular section. Further, it is desirable that the angle of the base line to the sides of the truncated cone section be 49°. Also, preferably, the third and fourth circular sections in said central structure may have preferably a uniform thickness of anywhere from 1/16" to 15/32", and have a uniform diameter of 2¼". In addition preferably there is a handle connected to the base plate such that the roller article can be utilized with facitility. In the most preferred embodiment of the instant invention the circular structure and the shaft are formed from an integral piece from a plastic such as a polycarbonate plastic, and the support members, the base plate and the handle are formed from an integral piece from a similar plastic such that the circular structure and the shaft are free to rotate about openings in said support members and such that the article is easy to assemble and utilize. The plastic that can be utilized to form the roller article may also be any of the well known plastics for the fabrication of similar articles such as polycarbonates, polypehnyleneoxide plastics, polystyrene plastics, polyvinylchloride plastics, etc. As an additional improvement in the fabrication of the roller article of the instant case, one of the support members on which the shaft of the circular structure is supported thereon may have an extending member extending beyond the leading edge of the central circular section such that the extending point of such support member can be utilized to force filler material in the vicinity of a corner. This projection can also be at the end of the handle. The extending member and support members on which the circular structure is supported, as well as the shaft, will be more fully explained herein below.

FIGURES

DESCRIPTION OF THE PREFERRED EMBODIMENT

Figure 1:
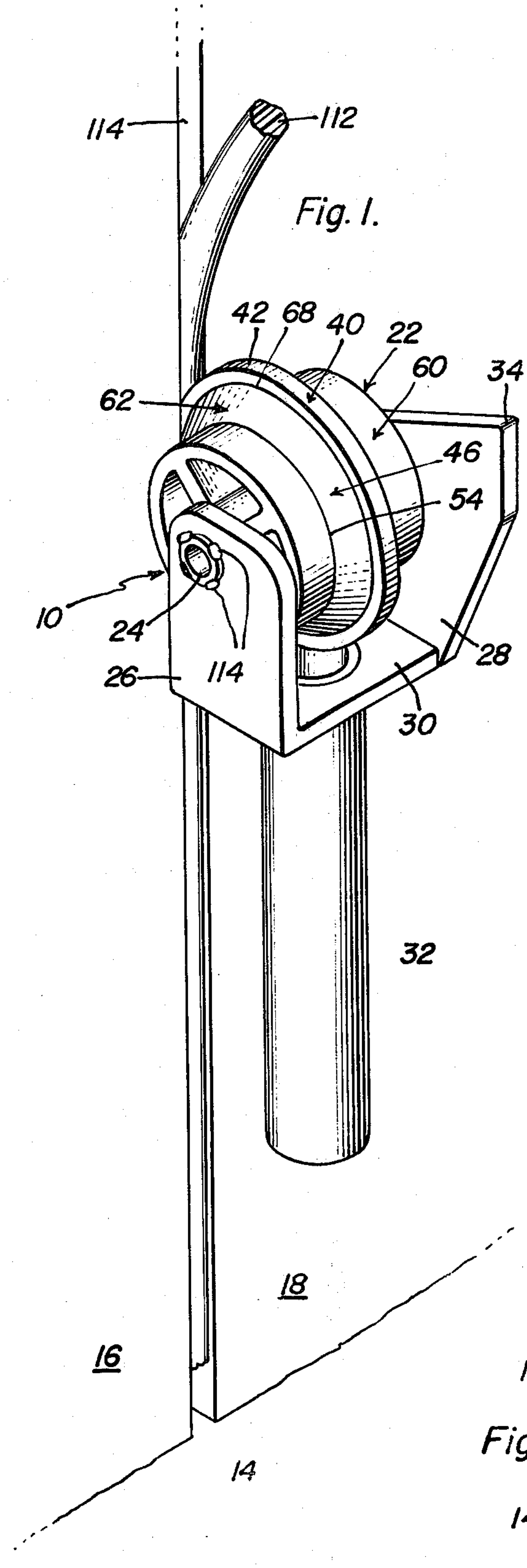
FIG. 1 is a prospective view of the roller article of the instant case inserting filler material into a crevice.

FIG. 1 shows roller (10) pushing filler material (12) ½" in diameter into a concrete crevice (14) which is formed from concrete blocks (16) and (18). Roller (10) comprises a circular structure (22) on a shaft (24) such that it is free to rotate said shaft supported on support member (26) and (28) which are further supported on base plate (30) which is attached to handle (32). Support members (26) and (28) are mounted on base plate (30) from which protrudes handle (32) which maybe formed in an integral piece or may be formed in parts and cemented or welded together, depending on whether the material is plastic or metal. It should be noted that support member (28) has an extending protruding section (34) whose purpose will be explained hereinbelow.

Figure 2:
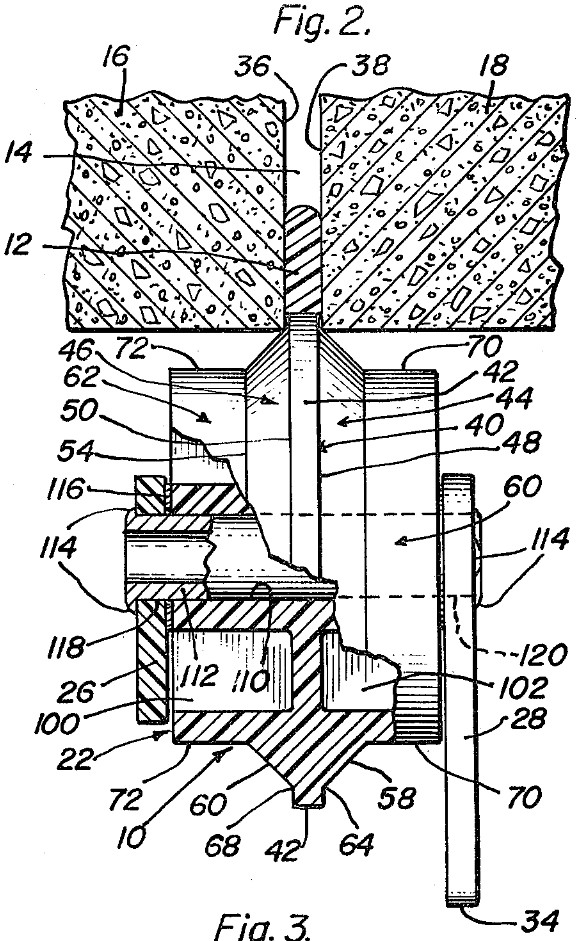
FIG. 2 is a top view and a partially cross-sectional view of the roller article of the instant case inserting a filler material into a concrete crevice ¼" thick.

FIG. 2 is a top view of the view of FIG. 1. The elongated filler material (12) is inserted in crevice (14), the distance between points (36) and (38) across the concrete blocks being ¼". It should be noted that the opening of a crevice may vary by as much as ½" from the bottom to the top of a particular crevice between concrete blocks. In any case for a ¼" opening a filler material of ½" diameter will act effectively as a filler material in such crevice with a variation from ¼" at one point to ¾" at another point. The present roller article functions effectively also in the placing of filler material to the proper depth in such crevices which may vary in width. The circular structure (22) is comprised of a central circular section (40) having leading edge (42) and preferably of a uniform thickness at the leading edge (42) such that said thickness is at least 1/16" but less than ¼" thick. Otherwise the leading edge (42) of the central circular section (40) will not fit in crevice (14). Preferably, the central circular section (40) has a diameter of 3″ and a uniform thickness of 3/16″. Appended to the central circular section (40), there are provided truncated conical sections (44) and (46) having base lines (48) and (50), with truncated cone lines (52) and (54) said cone sections being right angles truncated cone sections. Truncated cone sections (44) and (46) have conical side (58) and (60). In the construction for the most preferred embodiment of the instant case conical section (58) and (60) begin ⅛ to 2/8″ below the leading edge (42) of the central circular section of (40). Most preferably conical sides (58) and (60) start at a point (64) and (68) which is ⅛″ below the edge (42) of central circular section (40). More generally for a roller for a silicone system for inserting into crevices filler material, conical sections (60) and (58) form an angle with conical base lines (50) and (48) anywhere from 45 to 55°. Most preferably the angle is 49° for the roller article of the instant case so as to form the filler material into the crevice ½ of the width of the crevice. For an application where it is desired to have the roller push the filler material into a lesser depth or a larger depth, this angle may be varied. In the preferred roller of the instant case where the roller pushes the filler material (12) into crevice opening varying from ¼″ to ¾″ to a distance that is ½ of the opening of the width of the crevice then the angle between base lines (48) and (50) and conical sides (58) and (60) must be 49°. In the most preferred case, preferably the distance between base line (48) and base line (50) and the truncated sides (52) and (54) is 9/32 of an inch. However, such does not have to be the case. If it is desired as in the instant case for crevice widths of ¾″ or more that there be a constant depth into which the filler material (12) is pushed ⅜ of an inch then the distance between base lines (48) and (50) and truncated sides (52) and (54) should be 9/32 of an inch. If the 2 to 1 depth-width for pushing the filler material is desired to be maintained for crevice widths of ¾″ and larger, then the conical sides (60) and (58) may be extended further as is desired. Such that the distance between truncated sides (52) and (54) base line sides (48) and (50) can be larger than 9/32″ depending on a particular design that is utilized.

It must be emphasized again that the specific dimensions that are given above for the different sections are given for guidance in the preparation of a roller member for inserting filler material into crevices for the application thereof of room temperature vulcanizable silicone rubber compositions. The same concepts may be utilized to vary the dimensions of such roller member for the insertion of filler material in crevices for the application of other sealers in a different manner then would be the case with the room temperature vulcanizable silicone rubber compositions. At the edge of the truncated sides of the conical section (44) and (46), there is appended circular sections (60) and (62), which circular section (60) and (62) are preferably of uniform thickness or anywhere from 1/16″ to 15/32″ and having a uniform diameter of anywhere from 2¼″ or more. It is preferably the circular sections (60) and (62) have a uniform thickness of 15/32″. However, as noted previously these sizes may vary at will for the fabrication of a particular roller for a particular application. If it is desired, with the preferred roller article that for crevice thickness of ¾″ or larger that the depth of the filler material (12) remain constant then of course the circular section (60) and (62) should extend at least 15/32″ in thickness. Thus, sides (70) and (72) should be 15/32 of an inch in length. If, on the other hand the filler crevice in which article (10) is to be inserted, is never going to be above ¾″ in width then sides (70) and (72) need only extend for 1/16″. If the size of the crevice is to go up to 1 inch and 1½ inch in width, the roller article (10) of the instant case should be fabricated such that the length of sides (70) and (72) be at least 15/32″. It should be noted that the length of sides (70) and (72) may be even greater so as to be able to insert filler material into crevices even larger than 1½ inch wherein the filler material in such crevices will be inserted into such crevices at a constant depth of ⅜″ no matter how big the crevice is. All these variations in size in the sides of central circular section (40), truncated conical sections (44) and (46) and circular sections (60) and (62) are all well within the skill of an ordinary worker in the art.

For the preferred embodiment of the instant case the critical dimensions are the diameter of central circular section (40), the points (64) and (68) where conical sides (60) and (58) begin on central circular section (40) and the points where conical sides (60) and (58) terminate on meeting sides (70) and (72) of circular members (60) and (62). Of importance is also the length of conical sides of (58) and (60) and the diameter of central sections (60) and (62). In the preferred roller article of the instant case, it is preferred that circular section (40) have a diameter of 3 inches and that conical sides (58) and (60) start at a point (64) and (68), which is ⅛″ below leading edge (42) of central circular section (40). The size that the angle which conical sides (58) and (60) form with the base lines (48) and (50) of truncated cone sections (44) and (46) is also important and also that the length of the conical sides (58) and (60) being uniformly 12/32″ and that the distance between conical base lines (48) and (50) and truncated cone side lines (52) and (54) be 15/32″. Also, it is desirable that the circular section (60) and (62) have a uniform diameter of 2¼″ and a uniform thickness of 15/32″. These dimensions as stated above that will result in a roller article which is capable of inserting into concrete crevices of anywhere from ¼″ to ½″ filler material into the crevice in which the filler material is inserted automatically at a depth which is ½ the size of the width of the crevice opening as the width of the crevice opening varies from ¼″ to ¾″ and to insert the filler material in the crevice at a constant depth of ⅜″ where the width of the crevice is ¾″ or more.

It should be noted circular structure (22) has spaces in it (102) as shown in FIG. 2 as well as in the top portion of circular structure (22), which are not shown in the drawing. Such spaces serve no function but merely allow the fabrication of circular structure (22) without unduly expending too much plastic material in its fabrication. It is desired to make circular structure (22) as cheaply as possible while the roller is structurally sound. Accordingly, the circular structure (22) is hollowed out at convenient places while still maintaining its structural integrity and strength to save plastic material in the molding of the circular structure. It should be noted further, that the central circular section (40), truncated conical sections (44) and (46) and circular sections (60) and (62) may be formed independently and welded or adhered to each other by any convenient way or means. More preferably, all these parts are fabricated as integral parts. The circular structure (22) and its different parts may be found in separate parts independently and adhered to each other by any convenient means. In addition, the central circular section (40)

truncated cone sections (44) and (46) and circular section (60) and (62) have an opening therein (110) through which passes a hollow shaft (112), such that circular section (22) is free to rotate about the shaft (112) or is free to rotate with shaft (112). Shaft (112) has ribs in it (114) to allow the shaft to be supported numbers (26) and (28). There is also shown in FIG. 2 bushing (116) which allows circular structure (22) to freely rotate about hollow shaft (112).

It should be noted that the hollow shaft (112) passes through opening (118) and (120) in support members (26) and (28). It should be noted that said hollow shaft (112) does not have to be a separate unit from the central structure (22), but may be molded integrally with circular structure (22). In addition, it should be noted that retaining ribs (114) on hollow shaft (112) may not be present and the shaft which is formed integrally with circular structure (22) may be held in place by being present between support members (26) and (28) with the end of hollow shaft (112) simply passing through the openings (118) and (120) in support members (26) and (28). Support members (26) and (28) are constructed of heavy structural material so such that they do not bend easily. It should be also noted that hollow shaft (112) does not need to be hollow but is preferably constructed such that it is hollow so as to conserve on the plastic or metal material that is utilized to form the roller article.

Figure 3:
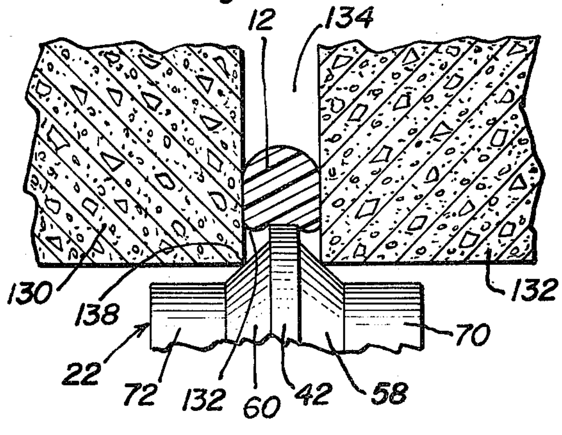
FIG. 3 is a top view of the roller article of the instant case and a partially cross-sectional view of the concrete blocks showing the roller article of the instant case inserting filler material in a crevice ½" thick.

Now preceeding to FIG. 3. FIG. 3 shows the same filler material (12) between concrete blocks (130) and (132) having a crevice (134) of width of ½". The filler material in such a crevice of ½" with the filler material being ½" in diameter takes the form shown in the FIG. 3 such that it is almost circular.

In accordance with the preferred design of the instant case, the leading edges of roller article (10) are shown in FIG. 3, such that the distance between the edge (132) of the filler material (12) and the edge (138) of crevice opening (134) at point (138) on sides (60) and (58) is ¼". Since the crevice opening is ½", the preferred roller article of the instant case automatically inserts a polyethylene filler material of ½" to a depth of ¼" in the crevice opening such insertion being done automatically by the preferred article of the instant case.

Figure 4:
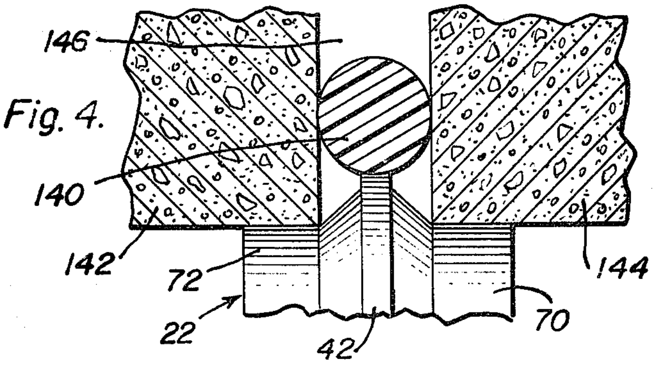
FIG. 4 is a partial top view, partial cross-sectional view showing the filler article of the instant case inserting filler material in a crevice ¾" thick.

FIG. 4 shows another view of the roller article of the instant case. Roller article (10) is inserting a polyethylene rod filler material (140) of ¾" in diameter. The crevice opening (146) which is between concrete blocks (142) and (144) is ¾" in width. Utilizing the roller article of the instant case, that is roller article (10) and having the preferred dimensions as was discussed previously, roller article (10) inserts the filler material (140) to a depth of ⅜" the edge (150) of the filler material from sides (70) and (72) being ⅜". It should be noted from this drawing that if this crevice opening (146) is larger than ¾" then the filler material (140) will still be inserted at the same depth of ⅜".

Figure 7:
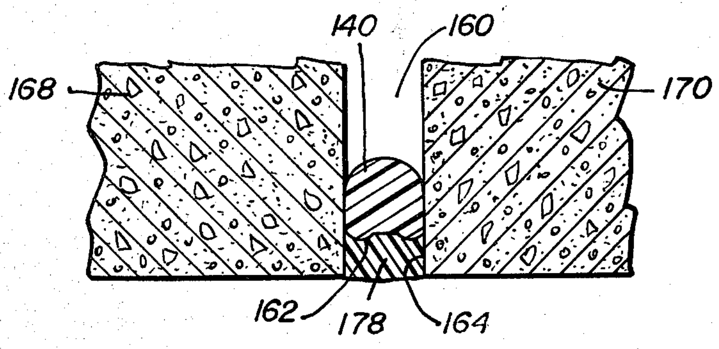
FIG. 7 is a cross-sectional top view showing the filler material in a crevice ½" thick sealed with a silicone sealant. The figures will be more fully explained hereinbelow.

Proceeding now to FIG. 7. FIG. 7 shows the same polyethylene rod (140) of ¾" shown in FIG. 4 inserted into a crevice (160) ½" wide. Accordingly, polyethylene rod filler material (140) is inserted by the preferred roller article of the instant case to a depth of a distance of ¼" measured from the leading edge (62) of polyethylene rod (140) to the leading edge (164) of the crevice formed from concrete blocks (168) and (170). FIG. 7 also shows the presence of room temperature vulcanizable silicone rubber composition sealant (178), which is utilized to seal the crevice and between concrete blocks (168) and (170) as was discussed previously. The sealant is utilized to seal the crevice after the filler material has been inserted into the crevice at the proper depth by the preferred article of the instant case.

Figure 5:
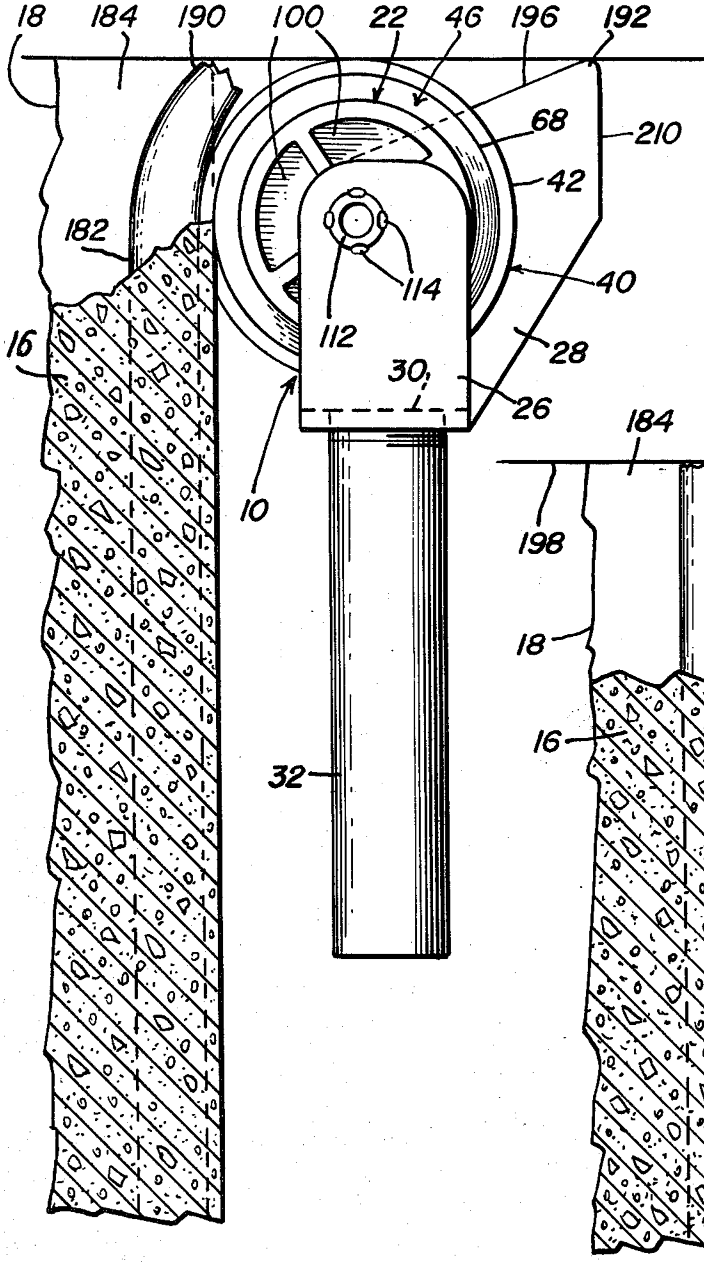
FIGS. 5 and 6 are side views showing the roller article of the instant case inserting filler material at a corner and more specifically the extending member of the support member forcing filler material into the crevice at a corner. Both FIGS. 5 and 6 also partially show fragmented sections of the concrete blocks and the crevice in the concrete block.
Figure 6:
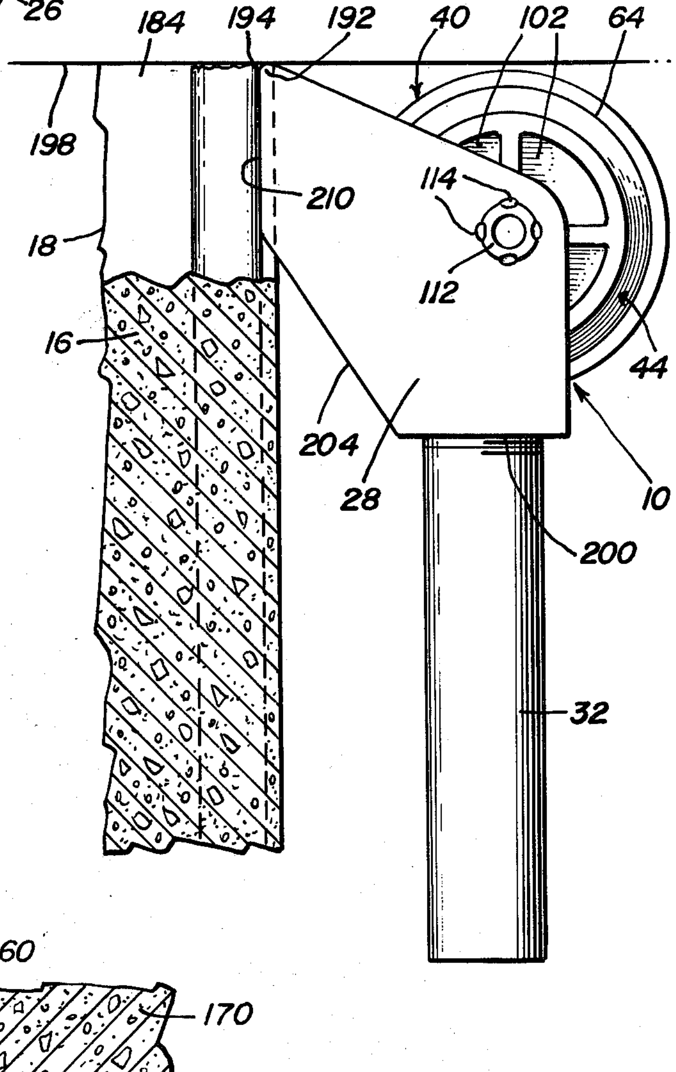

Now proceeding to FIG. 5. FIG. 5 shows the side view of the preferred roller article of the instant case (10) inserting polyethylene rod filler material (182) into crevice (184) between two concrete blocks with the leading edge (42) of circular structure (22) hitting a corner (198) at a ceiling. At this point the circular structure (22) is no longer capable of pushing in into the crevice the remaining section (190) of filler rod (182). Accordingly, one of the supporting sides (28) is constructed in the manner shown in FIGS. 5 and 6. Supporting side (28) has an extension (34) which roughly is formed by having a diagonal from the axis of shaft (112) at a 45° angle to the horizontal assuming roller article (10) is in a vertical position in FIGS. 5 and 6. Accordingly, extending member (190) from extension (34) is formed such that it reaches a point (192) reaching a horizontal line at the same point as leading edge (42) at the uppermost part of edge (42) of roller structure (22) when roller article (10) is in a vertical position as shown in FIGS. 5 and 6. FIG. 6 shows the point (192) pushing the last remaining part of filler material (182) into crevice (184) with extension point (192) at the corner (194) which is formed between the concrete blocks and a ceiling (198). Extending member (34) extends from support member (28) which is formed from a short support section (200) and backside (202) which is attached to base plate (30) and which is further attached to handle (32) for supporting the shaft (112) allowing the circular structure (22) to rotate thereon. In addition, support member (28) has extending sides (190) and (204) which meet or extend out to form point (192). Sides (204), (190) and (210) are formed such that the sides (210) and (190) come together at roughly a 45° diagonal with the horizontal proceeding perpendicular to the axis of shaft (112) assuming the roller article (10) in FIGS. 5 and 6 is in a vertical position. Side (210) is formed to the length that is desired to properly insert a polyethylene rod in the crevice adjacent to a corner that is a corner between the concrete blocks having the crevice therein and a ceiling or another wall to facilitate the pushing of the filler material into the crevice to the proper depth without any undue exertion by the construction worker. It should be noted that the top most point (192) of support member (28) must be capable of being or be as high as the top most point of leading edge (42) of circular central section (40) assuming that roller article in FIGS. 5 and 6 is in a vertical position for the extension member (34) on support member (28) to function as shown in the drawings and as discussed above. It is only shown in FIGS. 5 and 6 the method by which the roller article can be utilized to insert filler material in crevices when the roller article approaches a corner or a ceiling.

As mentioned previously, the roller article of the instant case can be utilized for inserting filler materials in any type of crevice whether it be concrete or crevices formed from bricks or cinder blocks. In any case, when it is desired to seal a crevice between two masonry surfaces or blocks, the instant roller article can be utilized with effectiveness and especially so with the utilization of room temperature vulcanizable silicone rubber composition sealants.

With respect to the sealant that may be utilized in the instant case, for application over filler material that is inserted in the crevice there are many such sealants that are known. The preferred sealants in the instant case are room temperature vulcanizable silicone rubber compositions, one-part or two-part.

It should be noted that the instant roller article is independent of the type of sealant that is applied. The dimensions varying or being varied for application of a particular sealant the desire depth. With respect to room temperature vulcanizable silicone rubber compositions, such compositions comprise generally a silanol end-stopped diorganopolysiloxane polymer with a viscosity anywhere from 1000 centipoise to 500,000 centipoise at 25° C., a filler material which may be an extending filler material such as lithapone, zinc oxide, etc. or may be reinforcing filler material such as fumed silica, or precipitated silica. In addition, it is utilized a cross-linking agent which may be either a methyltriacetoxy silane or a methyl trimethoxy silane but which more generally can be any alkoxy or acetoxy functional silane. In addition there is preferably present a catalyst which in the case of the alkoxy functional silanes as cross-linking agents is titanium chelate. In the case of acetoxy functional silanes, it is preferably a metal salt of a carboxylic acid.

Generally, the cross-linking agent is utilized at a concentration of 1 to 15 parts by weight based on 100 parts of silanol base polymer and the catalyst is utilized in the concentration of 0.1 to 5 parts per 100 parts of the silanol end-stopped base polymer. The filler material can be utilized at any concentration varying anywhere from 10 to 150 parts per 100 parts of silanol end-stopped polymer. Generally, some compositions include other additives such as adhesion promoters flame retardant additives, etc. Generally, the ingredients of such compositions which are known as one-part or one-component room temperature vulcanizable silicone rubber compositions are mixed together in an anhydrous state and then when exposed to atmospheric moisture cured to form a silicone elastomer, complete curing taking place to a silicone elastomer in about 24 hours. Another type of sealant that may be utilized with the roller to seal crevices for which the preferred roller article was discussed above ia a two-part or two-component room temperature vulcanizable silicone rubber compositions. Such compositions comprise the same silanol base polymer disclosed above for the one component systems and which generally comprise a silanol end-stopped diorganopolysiloxane polymer having a viscosity of anywhere from 1000 to 500,000 centipoise at 25° C. where the organo groups are selected from monovalent hydrocarbon radicals and halogenated monovalent hydrocarbon radicals, the same types of extending reinforcing fillers discussed previously and an alkyl silicate or a partial hydrolysis product of an alkyl silicate at a concentration of one to 15 parts by weight of the base silanol end-stopped polymer and a metal salt of a carboxylic acid ranging from lead to manganese in the periodical table. Again the catalyst may be utilized at a concentration anywhere from 0.1 to 5 parts based on 100 parts of silanol end-stopped base polymer. In addition other ingredients may be added to the composition such as nitrogen functional silane to improve its self-bonding characteristics, the use of flame retardant additives may be incorporated into it to enchance its flame retardant abilities. Generally, in such two-part or two-component systems, the silanol base polymer is mixed with a filler and kept separate; and the alkyl silicate or a partial hydrolysis product of an alkyl silicate and the catalyst is packaged in a separate package, which packaging does not have to be anhydrous. When the two-components or two packages are mixed, in the desired proportions then there results in a period of time anywhere of 10 minutes to 24 hours a silicone elastomer. Generally, in such a two-component system a tack-free coat is formed after the composition has been mixed and applied in a period of time anywhere from 10 to 15 minutes and the composition fully cures to a silicone elastomer in a total period of time of 24 hours. As stated previously, the instant preferred roller article and its dimensions thereof were given above because it is found that such roller article was most suitable for the inserting filler material into crevices over which silicone sealants would be applied and more preferably one-component room temperature vulcanizable silicone sealants.

Accordingly, if other types of sealants are applied the dimensions of the roller article of the instant case can be varied to accomplish the best type of filler insertion into crevices for a particular sealant system.

Examples of two-component room temperature vulcanizable silicone rubber composition is for instance to be found in Lampe U.S. Pat. Nos. 3,897,376 and 3,925,277, whose disclosure is incorporated in the present case by reference. Examples of one-component systems which may be utilized as sealants with the roller article system of the instant case is for instance to be found in Harvey P. Shaw U.S. Pat. Nos. 3,701,753 and 3,872,054 whose disclosure is hereby incorporated into the present case by reference. Such patents above are not given for the purpose of showing a preferred silicone sealant to be applied with the instant system, but are cited as disclosing the typical two-component or one-component room temperature vulcanizable silicone rubber composition which with modifications or without modifications may be utilized as silicone sealants applied over filler material to seal crevices in masonry and more specifically to fill crevices in concrete blocks in the construction of high-rise buildings.

I claim:

1. A roller for inserting filler material to the proper depth in crevices comprising (a) a circular structure having a central circular section being at least 1/16 of an inch, but less than ¼ of an inch thick, a first and second truncated right angle cone section of a smaller diameter than said central section and appended on each side of said circular section where the bases of said truncated cone sections are adjacent to the central section and a third and fourth circular section of uniform thickness appended to the truncated part of said cone sections and having a diameter which is as large as the diameter of cones at their truncated sides and having a thickness of at least 1/16 of an inch wherein the center lines of said central section, said truncated cone sections and said third and fourth circular sections coincide and wherein said circular section is symmetrical on either side of the center lines passing through said central circular section, wherein the leading edge of the base of said truncated cone sections are located from ⅛ to 2/8 of an inch from the outer diameter of said central circular section wherein the angle of the cone sides to the base line of said truncated cone sections is 49° wherein the central circular section has a diameter of 3 inches and wherein said third and fourth circular sections have a uniform thickness of from 1/16 to 15/32 of an inch and have a uniform diameter of 2¼ of an inch; (b) a shaft passing through an opening in said circular structure so as to support said circular structure and allowing it to rotate, the axis of said shaft being coincident with the axis of said circular structure; (c) two support members supporting said shaft on both sides of said circular structure and allowing said circular structure to rotate about said shaft and (d) a base plate connected to said support members, such that circular structure is free to rotate and being supported by said support members and said base plate.

2. The roller of claim 1 wherein the circular structure is formed from a plastic as an integral part, having the parts set forth hereinbefore.

3. The roller of claim 1 wherein the individual parts of said circular section are formed separately and are joined together.

4. The roller of claim 1, wherein the central circular section is of a uniform thickness of 3/16 of an inch thick.

5. The roller of claim 1 wherein said truncated cone sections have a thickness between said base side and the truncated side of 9/32 of an inch.

6. The roller of claim 1 wherein said shaft is formed integrally with said roller structure and wherein said shaft is free to rotate in circular openings in said support members.

7. The roller of claim 1 wherein there is a handle attached to said base plate.

8. The roller of claim 1 wherein to allow said roller to push filler material in crevices, etc., one of said support members has an extending member which extends in the opposite direction from said base plate and at a diagonal to a center line parallel or coincident to the center line of said support members such that the leading edge of said extending member extends beyond the largest diameter of a part of said circular structure.

9. The roller of claim 8 wherein said extending member extends from said support member such that its leading edge extends as far as the leading edge of said central circular section to a surface parallel to the axis of said central circular section and perpendicular to a center line of said central circular section which is perpendicular to said axis, on a 45° angle to a center line of said support members which is parallel or coincident with the center line of said central structure which is perpendicular to its axis.

10. The roller of claim 7 wherein said handle, base plate and support members are formed in an integral single unit.

* * * * *